Patented Nov. 1, 1949

2,486,756

UNITED STATES PATENT OFFICE 2,486,756

SYNTHETIC RESIN ADHESIVE

John F. Murphy, Springfield, Mass., and Russell Omdahl, St. Paul, Minn., assignors to Monsanto Chemical Company, St. Louis, Mo., a corporation of Delaware No Drawing. Application April 26, 1948,
Serial No. 23,395

5 Claims. (Cl. 260—29.6)

This invention relates to adhesive compositions. More particularly, the invention relates to aqueous emulsion adhesives which, when dry, are insensitive to moisture. More specifically, the invention relates to an aqueous emulsion adhesive for the application of polystyrene resin tiles to porous surfaces.

Tiles made from polystyrene are a recent development in the interior decorating field. They may be made in an infinite variety of colors and designs not heretofore attainable in the wall tile field. They have the added advantages of being impervious to moisture and relatively unbreakable. A major obstacle to their wide-spread use has been the lack of a suitable adhesive for attaching them to desired surfaces. Plaster, mortar, mastics, rubber cements and other adhesives have been tried with little or no success because they either would not stick to the polystyrene resin tiles, they were not impervious to moisture, they were not sufficiently shockproof, or they could not be cleaned from the surfaces of the tiles without marring said surfaces.

An object of this invention is to provide an aqueous emulsion adhesive.

A further object is to provide an adhesive for the application of polystyrene resin wall tiles to conventional interior decorating surfaces.

These and other objects are attained by preparing an aqueous emulsion from a polystyrene resin, kaolin, a plasticizer, an emulsifying agent and sodium silicate.

The following examples are given in illustration and are not intended as limitations on the scope of this invention. Where parts are mentioned, they are parts by weight.

EXAMPLE I 42 parts of morpholine oleate were dissolved in 255 parts of water. This solution was then used to dilute 250 parts of an aqueous emulsion of polystyrene containing 40% by weight of the resin. To the resulting emulsion were added 360 parts of a chlorinated diphenyl containing about 54% chlorine. Constant agitation was maintained during this addition to obtain a thorough dispersion of the chlorinated diphenyl. 285 parts of kaolin, 35 parts of bentonite and 87 parts of a 37% solution of sodium silicate were then added to the emulsion with constant agitation. The product was a smooth aqueous emulsion having a pasty consistency and a solids content of about 65%.

The paste emulsion was used to apply polystyrene wall tiles to a plaster surface. After a drying period of about a week at room temperature, it was found that the tiles were firmly and permanently bonded to the plaster. Hot water and steam did not loosen the tiles and the bond was resistant to repeated shock. The adhesive could be easily and quickly removed from the surface of the tiles without injury thereto providing such removal was carried out before the adhesive had dried.

Further installations of the tile on plywood, pressed wood and concrete surfaces were made using this adhesive with equally good results.

Four more adhesive compositions were prepared by the method shown in Example I using the ingredients in the table.

Table

| Ingredient | Example II | Example III | Example IV | Example V |
|---|---|---|---|---|
| Polystyrene Resin | 100 | 100 | 100 | 100 |
| Kaolin | 150 | 440 | 100 | 150 |
| Chlorinated Diphenyl | 360 | 500 | 150 | 500 |
| Emulsifier | 34 | 50 | 20 | 50 |
| Magnesium Silicate | 140 | | | 190 |
| Sodium Silicate | 15 | 60 | 4 | 60 |
| Zinc Sulfide | | | | 100 |
| Water | 151 | 71 | 78 | 71 |
| Percent Solids | 70 | 75 | 60 | 75 |

In the above table, the numbers refer to parts by weight of each component. The amount of water shown is the amount of water added in addition to that present in the original polystyrene emulsion used and in the sodium silicate solution used. In all cases, the original polystyrene emulsion contained 40% resin by weight and the sodium silicate was used as a 37% aqueous solution.

Each of the formulations in the above table was used to apply polystyrene resin tile to plaster, wood and concrete surfaces. After removal of the water by drying at room temperature, the bonds between the tiles and the various surfaces were found to be firm, resistant to moisture and resistant to shock. In all cases the adhesive could be removed from the faces of the tiles without marring the tiles, providing that the removal was effected before the emulsion dried.

The polystyrene resins used to prepare the adhesives of this invention are prepared by polymerizing styrene in aqueous emulsion according to known methods using persalts as polymerization catalysts and various sulfonic acids or salts thereof as emulsifying agents. The molecular weight of the polystyrene thus obtained may be varied from about 40,000 to about 200,000. As a matter of convenience, a 40% solids emulsion was used throughout the examples. This may be varied over a range of from 30% to 75% as desired. The amount of emulsion used for 100 parts of polystyrene will thus vary between about 130 and about 340 parts depending on the percent solids in the emulsion.

The kaolin used in the examples is an essential part of the invention. It is a relatively pure clay composed mostly of hydrous aluminum silicate. It appears to have a definite toughening effect on the polystyrene resin and cannot be replaced by other well known clays having different chemical composition. It may be used in proportions ranging from 100 to 450 parts per 100 parts of polystyrene resin.

The bentonite shown in Example 1 is a special type of clay that has the capacity of swelling in water. It may be used to modify the effect of the kaolin if used in quantities limited to the range of from about 10 to about 50 parts per 100 parts of polystyrene resin.

The chlorinated diphenyl shown in the examples acts as a plasticizer and flame retarder for the polystyrene resin. Other chlorinated aromatic hydrocarbons may be used such as the chlorinated terphenyls, the chlorinated naphthalenes and chlorinated diphenyls having other chlorine contents than that shown in the examples. The chlorinated hydrocarbons may be replaced in whole or in part by other well known plasticizers for polystyrene such as phthalate esters, phthalyl glycollates, phosphate esters, etc. It is essential, however, that a plasticizer or mixture of plasticizers be used in amounts ranging from about 150 parts to about 500 parts per 100 parts of polystyrene resin.

The morpholine oleate shown in the examples was used to supplement the action of the emulsifier present in the original emulsion. Other water-soluble emulsifying agents may be used to replace the morpholine oleate in whole or in part. The morpholine oleate is preferred due to the volatility of morpholine which leaves the adhesive on drying thereof and thus reduces the water sensitivity of the dried bond. The amount of emulsifying agent used may range from about 20 to about 50 parts per 100 parts of polystyrene resin.

The sodium silicate used aids in maintaining the fluidity of the emulsion during the addition of the kaolin and other fillers. It may have a slight delaying effect on the hardening of the adhesive, thus providing for more flexibility in the handling of the adhesive. It may be used in amounts ranging from about 4 to about 60 parts per 100 parts of polystyrene resin.

The magnesium silicate and zinc sulfide shown in the examples are fillers. They may be used in amounts varying from 100 to about 500 parts based on the polystyrene resin or they may be eliminated entirely, if desired. Other fibrous and granular fillers may also be used such as wood flour, asbestos, titanium dioxide, zinc oxide, etc.

An example of a method for making the original 40% solids polystyrene resin emulsion is to emulsify 100 parts of monomeric styrene in 150 parts of water using 5 parts of sodium oleate as emulsifying agent. 0.1 part of sodium persulfate catalyst is then added and the emulsion heated at reflux temperature with constant agitation for about 2 hours. The product is a fluid emulsion of polystyrene resin having a molecular weight between 100,000 and 200,000 and containing about 40% polystyrene resin by weight.

In order to prepare the adhesives of this invention from the polystyrene emulsions, it is necessary to observe a particular order of adding the various ingredients. First, the additional emulsifier is dissolved in the amount of additional water to be used to obtain the particular solids content desired This will vary from 75–300 parts depending on the percent solids in the polystyrene emulsion and the percent solids desired in the final adhesive. This solution is then used to thin the polystyrene emulsion. To this diluted emulsion the plasticizer is next added with agitation until thorough dispersion of the plasticizer is accomplished. Then the sodium silicate solution is added, followed immediately by the remainder of the ingredients. Constant and vigorous agitation must be maintained throughout the addition of all ingredients. By following this method, a smooth paste is obtained which has a consistency described by artisans as a "trowelling consistency."

In order to obtain the "trowelling consistency" the percent solids in the final emulsion may be varied between about 60 and about 80%. This consistency is influenced by the amount and type of fillers and plasticizers as well as the amount of kaolin used. For most applications a solids content of between 65% and 75% is preferred.

The adhesives thus prepared are easy to apply and produce firm permanent bonds which are not weakened by moisture or shock. The drying of the adhesives may take place at room temperature or it may be accelerated by gentle application of heat. However, an initial set is obtained almost immediately which is sufficient to hold the tile in place so that rapid drying is not necessary.

The adhesives may also be used to cement other materials together. Thus objects made from wood, plywood, concrete, plaster, etc. may be bonded together or to each other with these adhesives. They are particularly advantageous for bonding non-porous materials such as polystyrene tiles, synthetic resin sheets and laminates to porous materials.

It is obvious that many variations may be made in the processes and products of this invention without departing from the spirit and scope thereof as defined in the appended claims.

What is claimed is:

1. An aqueous emulsion adhesive composition containing from 60 to 80% solids comprising 100 parts of polystyrene resin, 100 to 450 parts of kaolin, 150 to 500 parts of a plasticizer for the polystyrene resin, 20 to 50 parts of a water-soluble emulsifying agent, and 4 to 60 parts of sodium silicate.

2. An aqueous emulsion adhesive composition containing from 60 to 80% solids comprising 100 parts of polystyrene resin, 100 to 450 parts of kaolin, 150 to 500 parts of a plasticizer for the polystyrene resin, 20 to 50 parts of a water-soluble emulsifying agent, 4 to 60 parts of sodium silicate, and 10 to 50 parts of bentonite.

3. A process for preparing an aqueous emulsion adhesive composition which comprises dissolving 20 to 50 parts of a water-soluble emulsifying agent in from 400 to 1500 parts of water, diluting from 340 to 130 parts of an aqueous emulsion of polystyrene resin containing from 30 to 75% solids by weight with said solution, adding thereto with constant agitation 150 to 500 parts of a plasticizer for the polystyrene resin, then adding from 4 to 60 parts of sodium silicate and finally adding 100 to 450 parts of kaolin with constant agitation.

4. An aqueous emulsion adhesive composition containing from 60 to 80% solids comprising 100 parts of polystyrene resin, 100 to 450 parts of kaolin, 150 to 500 parts of chlorinated diphenyl, 20 to 50 parts of a water-soluble emulsifying agent, and from 4 to 60 parts of sodium silicate.

5. A process as in claim 3 wherein the plasticizer is a chlorinated diphenyl.

JOHN F. MURPHY.
RUSSELL OMDAHL.

REFERENCES CITED

The following references are of record in the file of this patent:

UNITED STATES PATENTS

| Number | Name | Date |
|---|---|---|
| 2,387,367 | Vana | Oct. 23, 1945 |